(12) United States Patent
Huse

(10) Patent No.: US 6,193,924 B1
(45) Date of Patent: Feb. 27, 2001

(54) STORAGE TANK ASSEMBLY

(75) Inventor: O. C. Huse, Arlington, TX (US)

(73) Assignee: Moeller Marine Products, Twinsburg, OH (US)

( * ) Notice: Subject to any disclaimer, the term of this patent is extended or adjusted under 35 U.S.C. 154(b) by 0 days.

(21) Appl. No.: 09/169,363

(22) Filed: Oct. 9, 1998

Related U.S. Application Data

(63) Continuation of application No. 08/704,130, filed on Aug. 28, 1996, now abandoned.

(51) Int. Cl.[7] .............................. B29C 49/20; B29C 41/04
(52) U.S. Cl. ........................ 264/503; 264/516; 264/266; 264/274; 264/310; 264/311
(58) Field of Search ..................................... 264/516, 503, 264/266, 274, 310, 311

(56) References Cited

U.S. PATENT DOCUMENTS

| | | |
|---|---|---|
| 3,705,931 | 12/1972 | Confer et al. . |
| 3,742,995 | 7/1973 | Confer et al. . |
| 3,898,310 | 8/1975 | Schiemann . |
| 3,919,374 | 11/1975 | Komendowski . |
| 3,989,787 | 11/1976 | Scott, Jr. et al. . |
| 4,023,257 | 5/1977 | Wright et al. . |
| 4,323,411 | 4/1982 | Uhlig . |
| 4,536,116 | 8/1985 | Murray . |
| 4,539,172 | 9/1985 | Winchell et al. . |
| 4,589,563 | 5/1986 | Born . |
| 4,976,910 | 12/1990 | Gatley et al. . |
| 5,104,472 | 4/1992 | Kasugai et al. . |
| 5,356,589 | 10/1994 | Sugalski . |

FOREIGN PATENT DOCUMENTS 2307641   4/1975   (FR) .

*Primary Examiner*—Leo B. Tentoni
*Assistant Examiner*—Suzanne E. McDowell
(74) *Attorney, Agent, or Firm*—Howard & Howard

(57) ABSTRACT

A method of making a container assembly comprises the step of molding a container body over a portion of a plastic fixture. A plastic fixture is disposed in the mold. The mold has an inner surface defining an outer surface of a container. The fixture includes an opening and a portion having at least one ridge on a surface which is to be embedded in the body of the container. The fluid plastic material is disposed in the mold. The plastic material is then molded over the mold inner surface and the fixture surface thereby forming the container body. The plastic material contacts the ridge and melts or softens the ridge. The ridge is then deformed forming a locking engagement between the container body and the fixture. As the plastic material cools and hardens, the plastic container body partially engulfs the fixture to provide a secure seal between the fixture and container body.

8 Claims, 3 Drawing Sheets

STORAGE TANK ASSEMBLY

This is a continuation of U.S. application Ser. No. 08/704,130, filed Aug. 28, 1996, now abandoned.

BACKGROUND OF THE INVENTION

The present invention relates to a method of making a storage tank assembly, such as a fuel tank. The method includes the step of molding a container body over a portion of a plastic fixture to lock the fixture into the container body. The tank also includes easily installed components which can be easily mounted within the plastic fixture.

Traditionally, the fixtures in a plastic container such as a fuel tank are mounted to a metal plate. The metal plate provides a flat surface for a gasket which is used to prevent leakage of fuel from the tank. For example, the fixtures may be sandwiched between a pair of metal plates. The plates are bolted together with a gasket disposed between the plates to prevent leakage between the fixture and fuel tank. This requires placing a metal plate and screws inside the tank and on the outside of the tank. If the fixtures, gasket and metal plate are not properly aligned, leakage can occur around the screws and gasket.

Additionally, when plastic tanks expand due to pressure build-up within the tanks, they create a curved surface commonly called "crowning". Such crowning also affects the sealing ability of a gasket with respect to the tank. Fuel tanks which have undergone crowning provide poor sealing and fuel may leak out of the tank.

The prior art has not successfully addressed these problems. Thus, there has been a need for an improved plastic container assembly which provides improved high-pressure capacity using plastic fixtures without metal plates or gaskets. There has also been a need for an improved method of manufacturing these container assemblies.

SUMMARY OF THE INVENTION

The improved storage tank assembly of the present invention provides a fluid sealed tank without using gaskets or support plates which are typically used in plastic fuel tanks. The container assembly includes a plastic body and a plastic fixture. The plastic fixture has a first portion which defines an opening into the container body. A second portion of the plastic fixture includes at least one ridge on a surface of the fixture. The fixture surface and ridge are embedded in the container body and the ridge is deformed providing locking engagement between the fixture and the container body. When deformed, the cross section of the ridge is in the general form of a bead and the container body surrounds at least a portion of the bead to provide a positive lock between the fixture and the container.

In a method according to the present invention, a plastic container body is molded over a plastic fixture leaving a portion of the fixture partially embedded in the molded container body. A mold is provided having an inner surface and an orifice, wherein the inner surface defines an outer surface of the container body. A plastic fixture is disposed in the mold orifice with the fixture portion to be embedded in the container body positioned in the mold. The plastic fixture provides an opening into the molded container body. The plastic fixture also includes at least one ridge on a surface of the fixture which is to be embedded in the container body. A hot, fluid plastic material is introduced into the mold and forced against the mold inner surface and the surface of the fixture. The fluid plastic material softens or melts the ridge on the fixture. The ridge is deformed forming a locking engagement between the container body and the fixture. The ridge is further deformed due to the shrinkage of the fluid plastic material during cooling so as to form a bead which is at least partially surrounded by the plastic container body material. The plastic material also joins with the portion of the fixture embedded in the plastic container body. As a result, a container assembly is formed providing a secure seal between the container body and the plastic fixture. Thus, leakage which commonly occurs in plastic containers of this type is prevented even during crowning of the plastic container assembly.

In the disclosed embodiment, the ridges are initially triangular in cross-section. The molten plastic softens the triangular ridge and due to the force acting on the molten plastic, begins to force the apex of the ridge toward its base, flattening the apex and bulging the base into a generally bead shaped cross-section. As the molten plastic cools, it shrinks about the partially formed bead, further deforming the softened bead to engulf the bead within the cooling plastic to form a mechanical interlock. In cross-section, the deformed ridge has a bulbous head and narrow neck, all engulfed by the plastic of the container.

In the preferred embodiment, a roto-mold process is used to mold the tank. In this process, the molten plastic is introduced into the mold and the mold is rotated to force the plastic against the walls of the mold and against the plastic fixture. The plastic fixture is preferably made by an injection molding and same the same plastic composition as the container.

Another advantage of the fuel tank is that the gauges, inlets etc. are easier to fabricate and can have universal bases into which various components are inserted. This greatly reduces inventory and manufacturing costs.

These and other features of the present invention will be best understood from the following specification and drawings, of which the following is a brief description.

DETAILED DESCRIPTION OF A PREFERRED EMBODIMENT OF THE INVENTION

Figure 1:
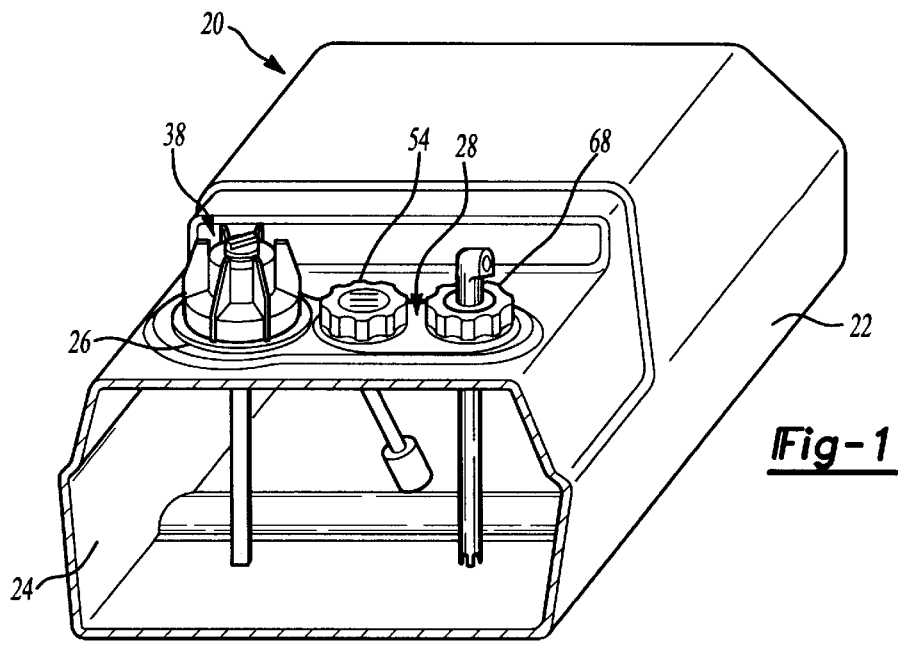
FIG. 1 is a cross-sectional, perspective view of a plastic container assembly in accordance with the present invention.

Referring to FIG. 1, a storage tank or container assembly according to the present invention is generally shown at 20. The tank includes a container body 22 which defines an interior 24 of the tank assembly 20. The container body 22 is a plastic material of the type known in the container art which is preferably made by a roto-mold process or other known processes. Container body 22 preferably comprises a high density polyethylene plastic material and has a general thickness of approximately 2 to 4 mm.

The tank assembly 20 also includes a plurality of fixtures 26, 28. Fixtures 26, 28 are pre-fabricated pieces and comprise, for example, an injection molded plastic material. Fixtures 26, 28 preferably comprise a high density polyethylene plastic. For reasons set forth below, container body 22 and fixtures 26, 28 preferably are made from the same plastic material. However, fixtures 26 and 28 will be thicker than the material of container body 22. Typically, fixtures 26 and 28 will have a general thickness of 4 to 7 mm. Fixtures 26, 28 each have a portion embedded in container body 22, as described below. Each fixture provides an opening into the interior 24 of tank assembly 20. Each fixture has a cap associated therewith which seals the interior 24 to retain a fluid in the interior 24 of container assembly 20.

The tank assembly 20 illustrated in FIG. 1 is a fuel tank of the type utilized in the marine industry. The fuel tank 20 includes an inlet cap 38 associated with fixture 26 through which fuel can be pumped into the fuel tank 20. Fuel tank 20 also includes a fuel gauge assembly 54 and a fuel line assembly 70 associated with fixture 28. Fuel disposed in tank 20 is drawn through fuel line assembly 70 and conveyed through a fuel line to an engine. Although a fuel tank is illustrated, it should be understood that this invention extends to other types of containers. Thus, the invention will be described generally as relating to a conventional container assembly.

Figure 2:
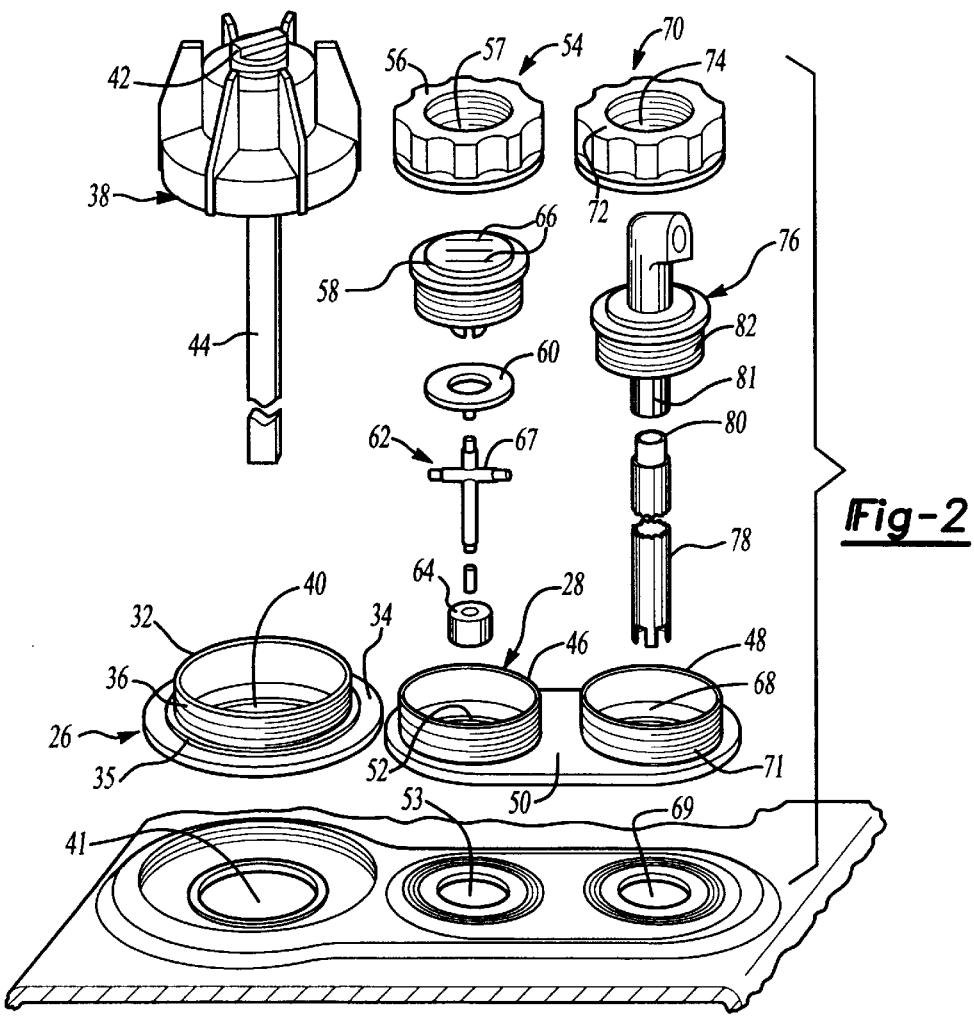
FIG. 2 is a partial exploded view of the fixtures and container body of the assembly or FIG. 1.

As shown in FIG. 2, an inlet fixture 26 includes a tubular portion 32 and a base 34 which extends generally radially from the tubular portion 32. Tubular portion 32 has a threaded outer surface 36 which receives a cap 38. Tubular portion 32 defines an opening 40 through which a fluid may be pumped into container assembly 20. Opening 40 extends into the interior 24 of container assembly 20 through a hole 41 in container body 22. Cap 38 includes a pressure release plug 42 and a dipstick 44. Cap 38 also includes a plurality of flanges 30 at generally equally spaced points around the periphery of cap 38 which facilitate turning of cap 38.

Container assembly 20 also includes a twin fixture 28 which has a common base 50. Fixture 28 includes a pair of tubular portions 46, 48. Base 50 extends generally radially from and is integral with tubular portions 46, 48. Tubular portion 46 has a threaded outer surface 47 and defines an opening 52 which extends into the interior 24 of container assembly 20 through a hole 53 in container body 22. Tubular portion 46 receives a fuel gauge assembly 54. Fuel gauge assembly 54 includes a cap 56 having a hole 57. Cap 56 is threadably received onto threaded outer surface 47 of tubular portion 46. Fuel gauge assembly 54 also includes a cover 58 having seals 59, a washer 60 and a T-shaped pivot arm 62 having a float 64 disposed at a lower end of arm 62. Cover 58 fits into opening 52. Washer 60 supports pivot arm 62 in cover 58. A cross bar 67 of arm 62 rests below washer 60 within cover 58. When there is fluid in the interior 24 of container assembly 22, float 64 floats on the fluid and a top end 65 of pivot arm 62 indicates the level of the fluid corresponding to marks 66 on a top surface of cover 58. Pivot arm 62 pivots on horizontal crossbar 67 as the level of the fluid changes.

Tubular portion 48 defines an opening 68 which extends into container body 22 through a hole 69 in container body 22. Tubular portion 48 also has a threaded outer surface 71 which receives a fuel line assembly 70. Fuel line assembly 70 includes a cap 72 having a hole 74. Fuel line assembly 70 also includes a fuel line tube 76 and an extension tube 78. Extension tube 78 has a nipple portion 80 at a top end of tube 78 which fits into a lower end 81 of fuel line tube 76. Fuel line tube 76 includes a plug 82 which fits into opening 68 plug 82 has seals 59 to seal if with respect to portion 48. Cap 72 fits over fuel line tube 76 and is threadably received onto threaded outer surface 71 of tubular portion 48. A lower end 84 of extension tube 78 has a section 85 cut away to allow fluid in container 20 to be drawn into tube 78 and through fuel line tube 76. Fuel line tube 76 has an outlet 86 through which the fluid exits and which may be conveyed to a fuel line (not shown) leading to, for example, an engine. Fuel line tube 76 is adapted to rotate 360° about its vertical longitudinal axis. Fuel line tube 76 may be rotated such that outlet 86 faces in any desired direction. Because fuel line tube 76 can be rotated to face any desired direction, it facilitates connection to any hose or tube regardless of the direction from which the hose or tube reaches the container 20.

The fixtures 26 and 28 allow for interchangeable components to be used. The fixtures 26 and 28 are uniformly designed receptacles adapted to receive any desired components. As should be apparent, the components illustrated could be reassembled in the various fixture openings. For example, the cap 38 could be mounted in the middle and the fuel gauge 54 could be mounted on the end.

It should also be understood that the fixtures 28 could be separated into two separate fixtures like fixture 26. Furthermore the fixtures 26 and 28 could be made into a single three opening fixture. Additional fixtures could also be used if desired.

Figure 3:
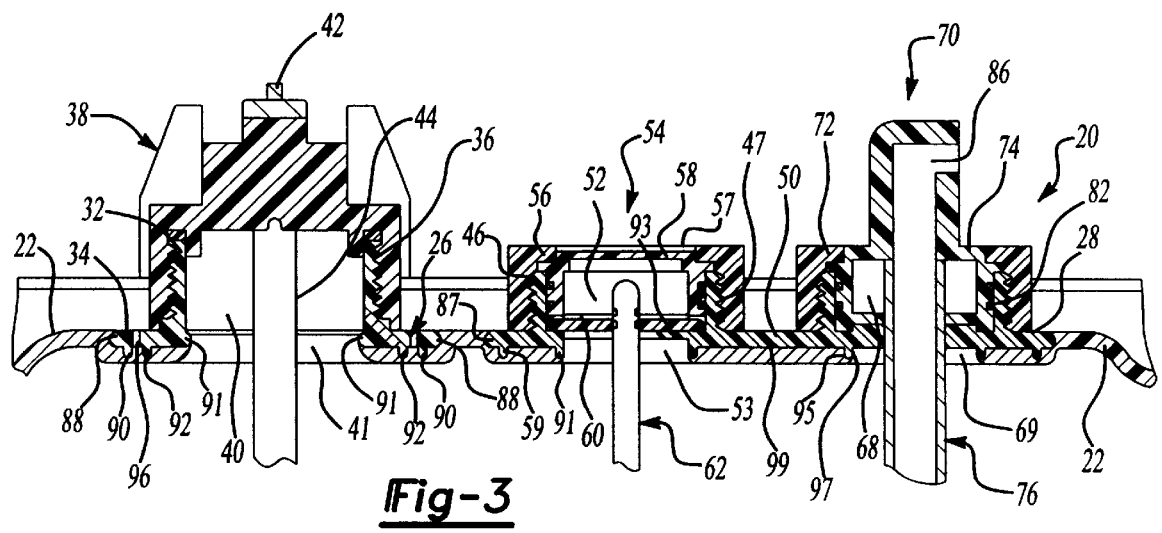
FIG. 3 is a partial, cross-sectional view of the fixtures and container body of the assembly of FIG. 1.

As shown in FIG. 3, bases 34 and 50 are embedded in plastic container body 22. Base 34 has a plurality of deformed ridges 88, 90, 92, 94 extending from base 34 and embedded in container body 22. Deformed ridges 88, 90, 92, 94 are in locking engagement with container body 22 in accordance with the method of the present invention, described herein below. Thus, container body 22 partially encloses deformed ridges 88, 90, 92, 94. Ridges 90, 92 extend downwardly from a lower lace 96 of base 34 and form rings on face 96 around opening 40. Ridge 88 extends radially from an outer periphery of base 34 away from opening 40. Ridge 94 extends radially from an inner periphery of base 34 into opening 40. As described further below, ridges 88, 90, 92, 94, are joined in locking engagement with container body 22, thus providing superior sealing of the container assembly 20. When pressure builds in the interior 24 of the container assembly 20, leaks will be prevented even if rounding of the top portion 23 of container assembly 20, known as crowning, occurs.

As with fixture 26, fixture 28 has a plurality of deformed ridges 87, 89, 91, 93, 95, 97 extending from base 50 and embedded in container body 22. Ridges 93 and 97 extend downwardly from a lower face 99 of base 50 and form rings on face 99 around openings 52 and 68, respectively. Ridge 87 extends radially from a periphery of base 50 and face away from openings 52 and 68. Ridges 93 and 97 extend radially from an inner periphery of openings 52 and 68, respectively, and face into such openings. Ridge 89 extends downwardly from face 99 and forms a loop around ridges 91 and 95 and their respective openings 52 and 68. Ridges 87, 89, 91, 93, 95, 97 are also in locking engagement with container body 22. That is, container body 22 partially encloses deformed ridges 87, 89, 91, 93, 95, 97.

Figure 4:
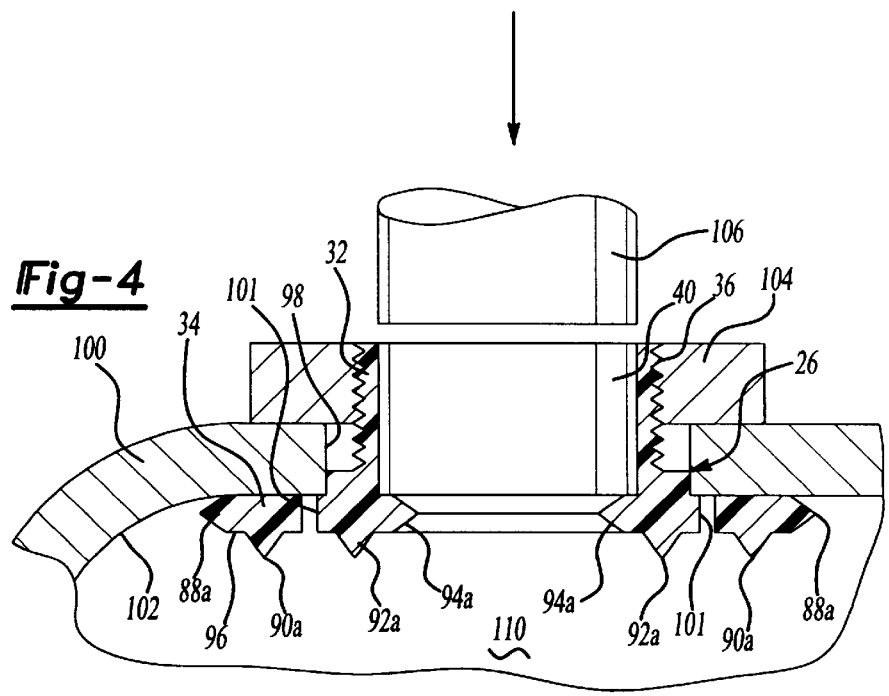
FIG. 4 is a cross-sectional partial view of a fixture in an orifice of a mold prior to a molding step of a method of the present invention.
Figure 5:
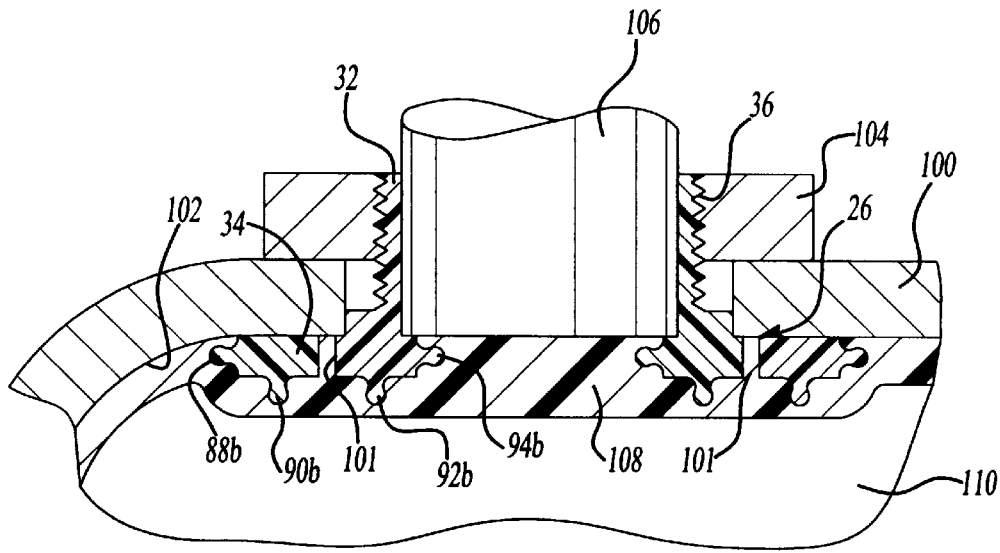
FIG. 5 is a cross-sectional view of the fixture during a molding step of a method of the present invention.
Figure 6:
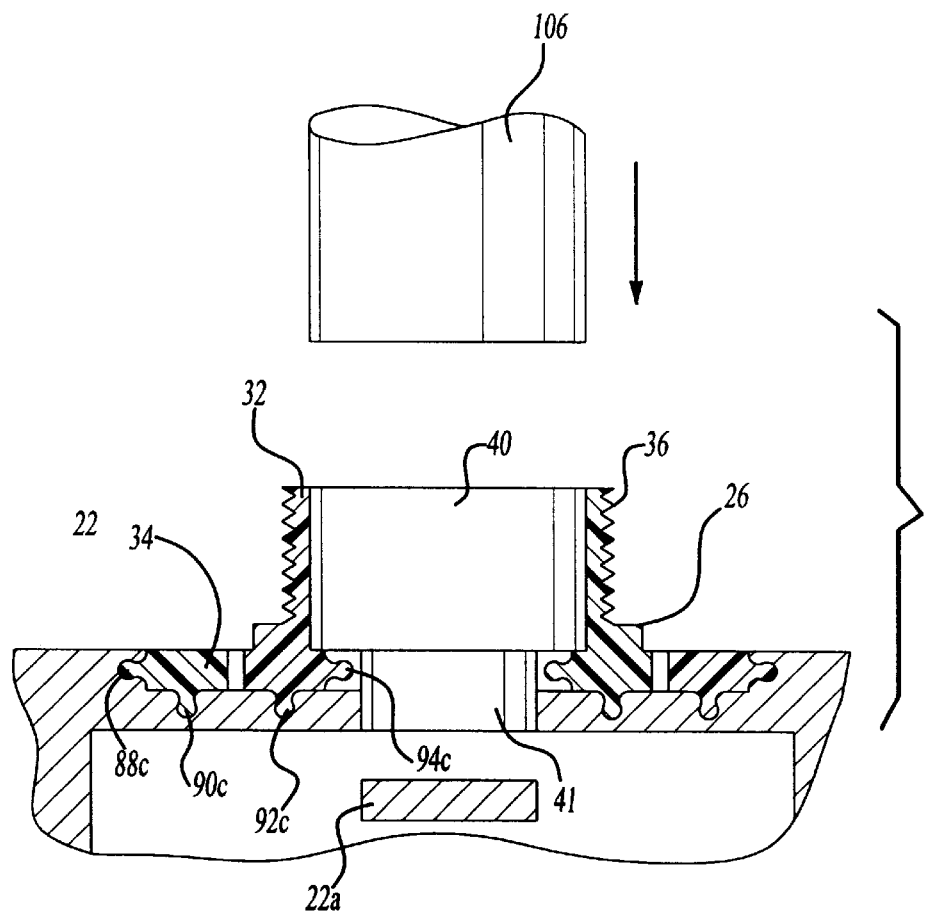
FIG. 6 is a cross-sectional view of the fixture after the molding step of a method of the present invention.

In FIGS. 4–6, a process of the present invention is illustrated. As shown in FIG. 4, fixture 26 is placed in an orifice 98 of a mold 100. An inner surface 102 of mold 100 defines an outer surface 25 of container body 22. Tubular portion 32 of fixture 26 extends outwardly from mold 100 and base 34 is disposed in mold 100. Fixture 26 is secured in mold 100 by fastening an internally threaded nut or washer 104 over threaded portion 36 of fixture 26. Ridges 88a, 90a, 92a, 94a extend from base 34, as described above, into mold 100. A plug 106 is inserted into opening 40 to seal mold 100 and prevent fluid plastic resin from passing through opening 40 out of mold 100.

As shown in FIG. 5, hot fluid plastic resin 108 is disposed over inner surface 102 of mold 100, base 34 and plug 106. This step can be performed, for example, by any plastic molding method which is well-known in the art. The preferred plastic molding method is roto-molding. In this process, molten plastic is placed in the mold and the mold is rotated at high speeds. Centrifugal force acts on the plastic 108 forcing it against the inner mold surface 102. The molten plastic 108 contacts the ridges of fixture 26 and softens or melts them deforming and interlocking them with the plastic material 108. Vent holes 101 are provided for venting any air trapped between the ridges. These vent holes are sealed by the plastic resin material 108 as the process is completed.

In another example, in a common blow-molding process, a parison of fluid plastic resin may be positioned in the interior 110 of mold 100. Pressurized air is then blown into the parison in mold 100, thereby expanding the parison and conforming the parison to the inner mold surface 102. The hot fluid plastic resin 108 contacts the ridges of fixture 26 and begins to soften or even melt ridges 88b, 90b, 92b, 94b. Vent holes 101 are again disposed in base 34 at spaced points around the openings.

As shown in FIG. 6, fluid plastic resin 108 cools and hardens forming container body 22. As fluid plastic resin 108 cools limited shrinkage of the resin occurs, drawing molten ridges 88b, 90b, 92b, 94b and container body 22 together. Ridges 88b, 90b, 92b, 94b are deformed thereby producing locking ridges 88c, 90c, 92c, 94c which are in the form of beads in locking engagement with container body 22. At the same time, ridges 88, 90, 92, 94 and face 96 join with the plastic material of container body 22. Plastic material 108 will join better to fixture 26 if they comprise the same plastic material. Thus, plastic material 108 and fixtures 26, 28 preferably comprise high-density polyethylene plastic. After a suitable cooling period, washer 104 and plug 106 are removed from fixture 26. Container assembly 20 is then removed from mold 100. A portion of container body 22a is then removed, thereby forming hole 41 in container body 22. Portion 22a may be removed by known methods, such as, drilling or cutting the plastic material. In an alternative embodiment, plug 106 may extend further into mold interior 110, thereby defining hole 41 of container body 22. In such a method, there would be no requirement to bore out the portion of container body 22a. When plug 106 is removed, opening 40 would extend through hole 41 left by plug 106 into interior 24.

A preferred description of this invention has been disclosed; however, a worker of ordinary skill in the art would recognize that certain modifications would come within the scope of this invention. For that reason, the following claims should be studied in order to determine the true scope and content of this invention.

What is claimed is:

1. A method of making a container assembly, said method comprising the steps of:

first disposing a plastic fixture into an orifice of a mold, said mold having an inner surface defining an outer surface of a container, wherein said fixture includes a top surface, a bottom surface and an opening, said bottom surface having first and second spaced ridges extending from said bottom surface adjacent but not entering said opening and at least one vent hole extending through said fixture between said ridges, said ridges to be embedded in a body of said container;

then disposing a fluid plastic material into said mold; and molding said plastic material by simultaneously forcing said material against said mold inner surface and said fixture, thereby forming said container body, said plastic material engulfing said ridges and deforming said ridges and forming a locking engagement between said container body and said fixture, said plastic material sealing said vent hole as said plastic material engulfs said ridges to establish an airtight seal; wherein said entire top surface of said fixture and said opening remain free of said plastic material.

2. A method of making a container assembly as defined in claim 1, wherein said method includes contacting said ridges with said fluid plastic material and melting or softening said ridges, followed by cooling said fluid plastic material and deforming said ridges, and engulfing said plastic material about said fixture ridges.

3. A method of making a container assembly as defined in claim 2, wherein said method includes cooling said fluid plastic material to shrink said fluid plastic material about said deformed ridges.

4. A method of making a container assembly as defined in claim 1, wherein said method includes cooling said fluid plastic material and deforming said ridges into a bead, wherein said container body substantially encloses said bead.

5. A method of making a container assembly as defined in claim 1, wherein said plastic fixture is an injection molded plastic fixture and said method includes disposing a parison of molten high density polyethylene plastic material in said mold.

6. A method of making a container assembly as defined in claim 5, wherein said method includes blowing pressurized air into the parison, thereby expanding and conforming the parison to the mold inner surface.

7. A method of making a container assembly as defined in claim 1, further including the step of rotating said mold such that said fluid plastic is forced to said inner surface of said mold by centrifugal force.

8. A method of making a container assembly as defined in claim 1, wherein said plastic fixture further includes a plurality of ridges extending from said bottom surface.

* * * * *